United States Patent [19]
La Marre et al.

[11] 3,831,104
[45] Aug. 20, 1974

[54] LASER TRANSMITTER

[75] Inventors: David A. La Marre, Woodstock, Conn.; Albert D. Battista, Worcester, Mass.; Donald A. Smith, Woodstock, Conn.

[73] Assignee: American Optical Corporation, Southbridge, Mass.

[22] Filed: Sept. 5, 1969

[21] Appl. No.: 855,496

[52] U.S. Cl....... 331/94.5 D, 331/94.5 PE, 264/272
[51] Int. Cl. ........................... H01s 3/02, H01s 3/09
[58] Field of Search .................................... 331/94.5

[56] References Cited
UNITED STATES PATENTS
3,311,845  3/1967  Koester............................. 331/94.5
3,518,570  6/1970  Dittrich............................. 331/94.5

OTHER PUBLICATIONS

Miles et al., "Optically Efficient Ruby Laser Pump", J. Appl. Phys., 32, 1961, pp. 740–741. QD1 A749.
Harper, "Embedding Processes and Materials", Machine Design, June 9, 1966, pp. 150–173. TJ1 MI6.
Reynolds et al., "Frequency Stabilized Gas Laser", Final Report Control NAS 8–20631, Star accession No. N67–20379, A Copy of Star, 5, (9), May 8, 1967, is enclosed (pp. V, VI, 1457 and cover page) to set pub. date of May 8, 1967, pp. iii–vi, 28–34, 55–61, title page and cover page. avail. from N.T.I.S.
AO, "Glass Laser Technology", Laser Focus, Dec. 1967, pp. 21–29.

Primary Examiner—John K. Corbin
Assistant Examiner—R. J. Webster
Attorney, Agent, or Firm—Lane, Aitken, Dunner & Ziems

[57] ABSTRACT

In a laser transmitter employing a glass laser rod, the laser rod, a flashlamp for exciting the rod, and pump light reflector are encapsulated in a resilient potting material and the resulting assembly is secured in a frame by means of a resilient potting material. The reflectors defining the laser cavity together with other elements of the cavity are also mounted in pockets defined in the frame. A circuit is provided to generate high voltages from a low voltage supply for energizing the flashlamp and for Q switching the laser cavity by means of a Pockels cell.

1 Claim, 12 Drawing Figures

INVENTORS
DAVID A. LAMARRE,
ALBERT D. BATTISTA &
DONALD A. SMITH

BY Lane, Aitken, Dunner & Ziems
ATTORNEYS

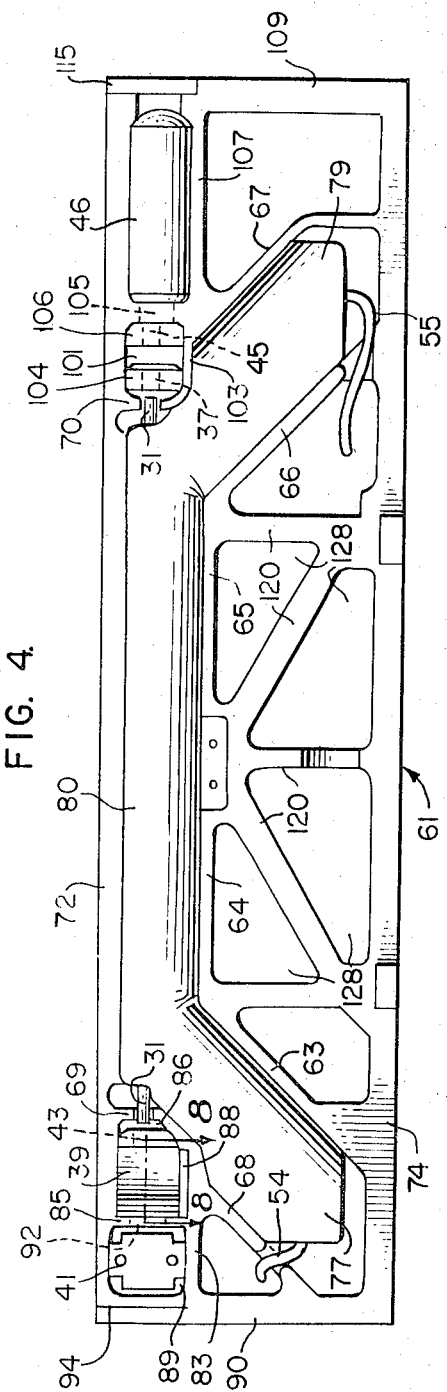
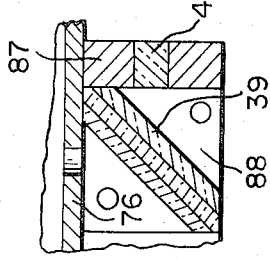
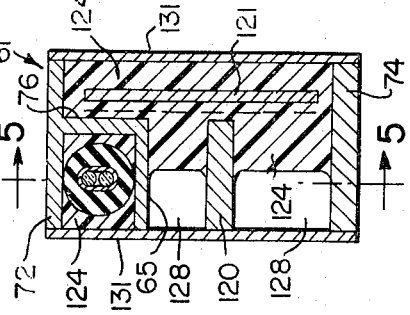
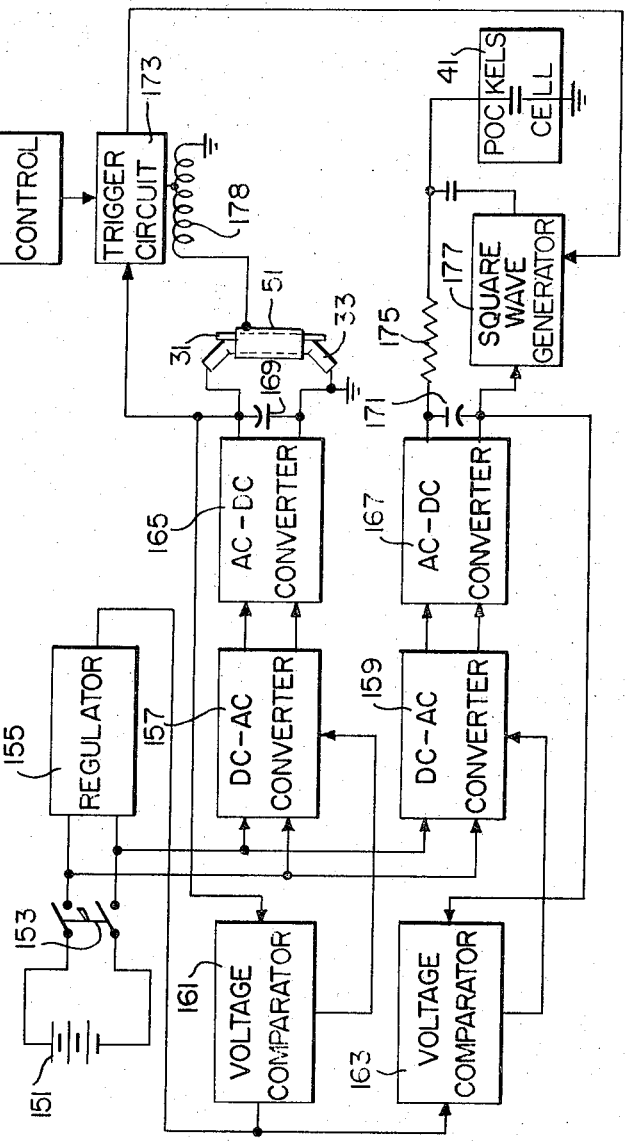
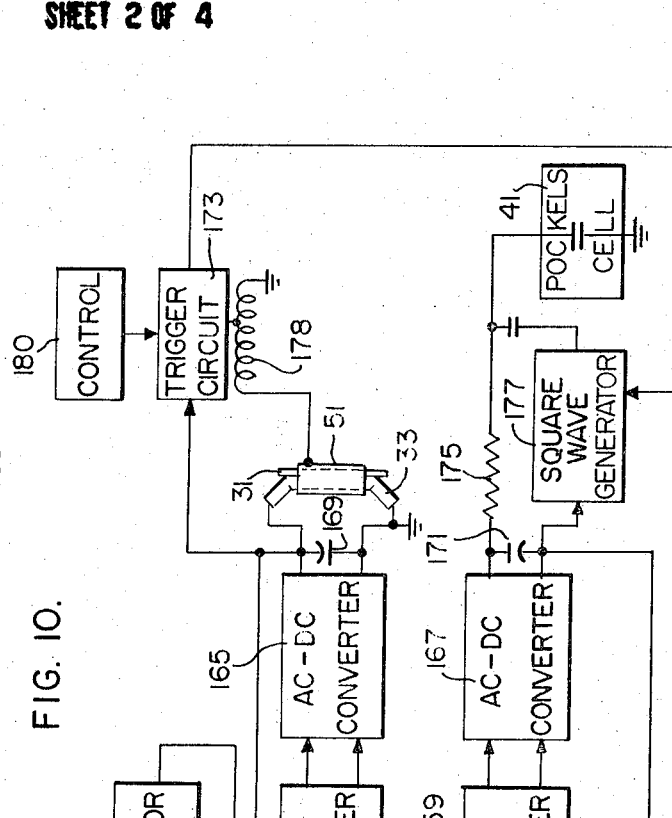
INVENTORS
DAVID A. LAMARRE,
ALBERT D. BATTISTA &
DONALD A. SMITH

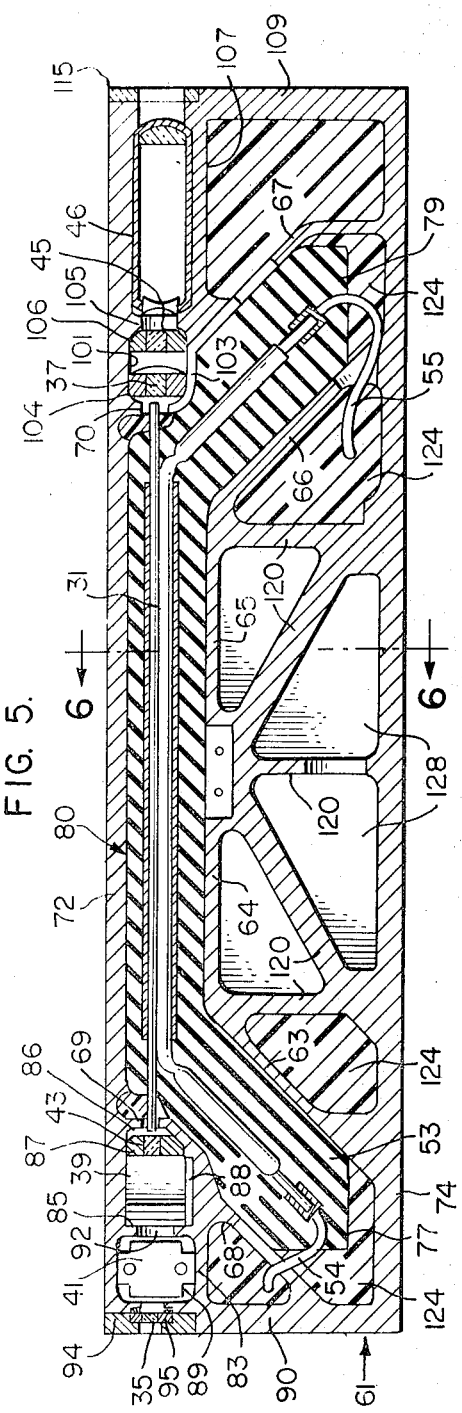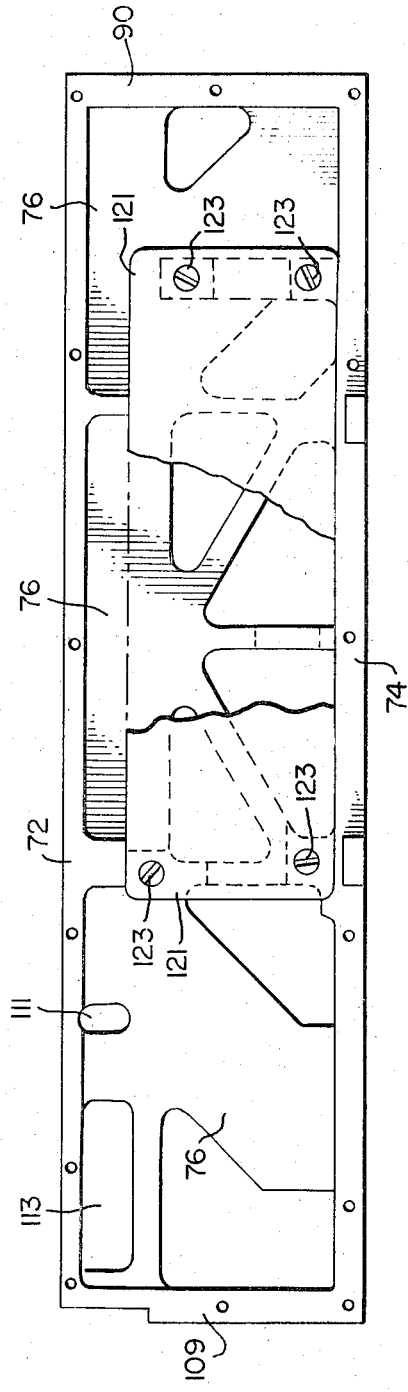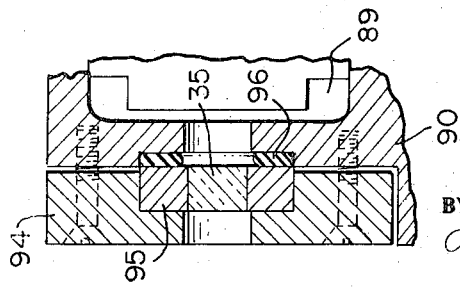

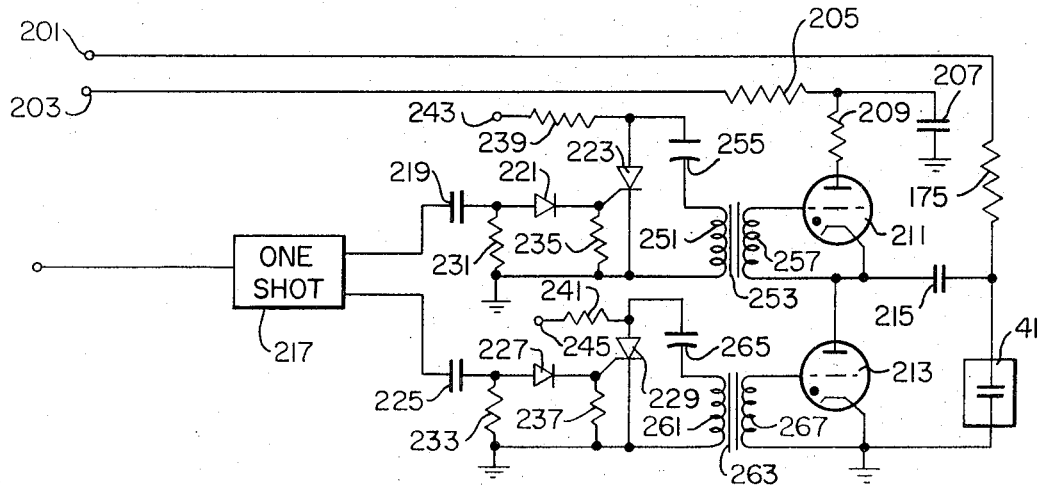

LASER TRANSMITTER

BACKGROUND OF THE INVENTION

This invention relates to laser transmitters and, more particularly, to a lightweight rugged laser transmitter employing a glass laser rod as the laser material.

One important application of laser transmitters is in rangefinders such as are used by snipers. A rifle can be fired with great accuracy if the sniper knows the exact distance to the target. In such an application, the laser transmitter must be very rugged, particularly if it is to be mounted on the rifle since the transmitter must be capable of withstanding the shock of the high acceleration forces generated upon discharge of the bullet from the rifle. The problem of ruggedness is particularly acute in a laser transmitter because of the presence of the laser rod and necessary optics for generating and transmitting the pulse of laser energy.

SUMMARY OF THE INVENTION

The laser transmitter of the present invention comprises a glass laser rod and a flashlamp which are enclosed by a pump light reflector. The assembly of the flashlamp and the rod and the pump light reflector are encapsulated in a potting compound and the assembly is mounted in a lightweight frame together with reflectors defining a laser cavity, a Pockels cell, a polarizer, a telescope and two filters.

The filters prevent visible light from the flashlamp from being radiated from the unit and from entering the Pockels cell. The Pockels cell together with the polarizer controls the laser oscillations in the cavity and serves to switch the laser oscillations on and then off again to generate a short laser energy pulse, which is transmitted to the target through the telescope. The Pockels cell is controlled to switch the laser oscillations on by means of a unique high voltage switching circuit, which produces the high voltage switching levels from a small lightweight inexpensive battery. The elements of the laser transmitter are all held in place in the frame by a resilient potting compound. The feature of encapsulating the assembly of the laser rod, flashlamp, and pump light reflector and holding this assembly in position in the frame by means of a resilient potting compound is in part what provides the laser transmitter of the present invention with its ruggedness.

Accordingly, an object of the present invention is to provide an improved laser transmitter.

Another object of the present invention is to increase the ruggedness of lightweight laser transmitters.

A further object of the present invention is to provide a small rugged lightweight laser transmitter.

Further objects and advantages of the present invention will become readily apparent as the following detailed description of the invention unfolds and when taken in conjunction with the drawings.

BRIEF DESCRIPTION OF THE DRAWINGS

FIG. 4 is a front side view in elevation of the aluminum frame with the elements of the laser transmitter in place before the potting compound is added to secure the encapsulated assembly of FIG. 3 in place;

FIG. 5 is a sectional view taken along lines 5—5 of FIG. 6 through the laser transmitter of the present invention mounted in the aluminum frame with the encapsulated assembly of FIG. 3 potted in place;

FIG. 6 is a sectional view through the laser transmitter mounted in the frame taken along the lines 6—6 of FIG. 5;

FIG. 7 is a view in elevation of the back of the aluminum frame with a printed circuit card mounted in place on the frame before the potting compound has been added to the frame;

FIG. 8 is a fragmentary sectional view through a portion of the frame with the laser transmitter mounted in place taken along lines 8—8 of FIG. 4;

FIG. 9 is an enlarged fragmentary view of a portion of the section shown in FIG. 5;

FIG. 10 is a block diagram of the electronic circuitry used to operate the laser transmitter of the present invention;

FIG. 11 is a circuit diagram of the portion of the circuit shown in FIG. 10 for applying a high voltage squarewave to the Pockels cell; and, FIG. 12 is a block diagram illustrating the laser transmitter of the present invention in a rangefinder application.

DESCRIPTION OF THE PREFERRED EMBODIMENTS

Figure 1:
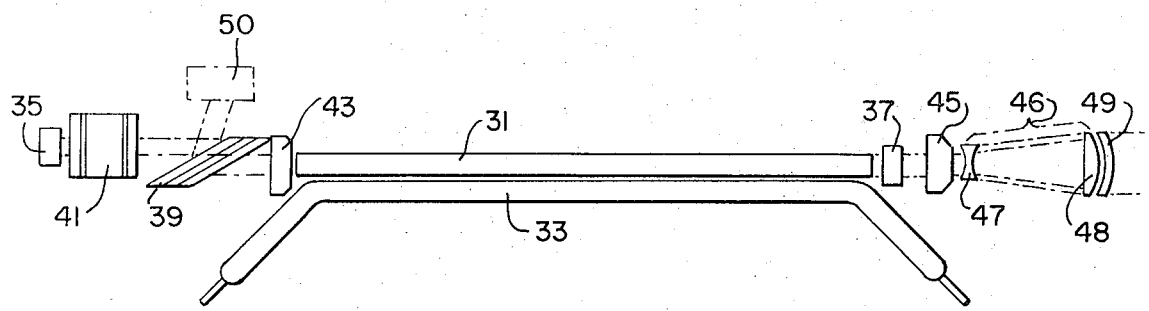
FIG. 1 schematically illustrates the optical system of the laser transmitter of the present invention.

FIG. 1 schematically illustrates the optical components of the laser transmitter and how they interact. As shown in FIG. 1, the transmitter comprises a rod 31 of laser glass adjacent to which is positioned an inert gas flashlamp 33 for pumping the rod 31 to put it in a condition in which it will lase or amplify laser light. The ends of the flashlamp 33 are angled away from the rod 31 to reduce the overall length of the transmitter and make a more convenient mounting arrangement in the frame, not shown in FIG. 1. The laser rod 31 is placed axially in a laser cavity defined by reflectors 35 and 37. Between the reflector 35 and the rod 31 is a polarizer 39 comprising a pile of plates positioned at Brewster's angle and a Pockels cell 41. Between the polarizer 39 and the rod 31 is a filter 43 which transmits only infrared light.

When the flashlamp 33 is energized it will irradiate the rod 31 and excite the laser glass of the rod 31 to a state in which it will spontaneously emit light of a particular wavelength and will amplify light of this wavelength. Light of the wavelength which will be spontaneously emitted and amplified by the laser material is referred to as laser light. The light which is used to irradiate the rod 31 to excite it to a state in which it will amplify laser light is called pump light and the process of exciting the rod 31 with pump light is called pumping. In the preferred embodiment, the laser glass is glass doped with neodymium for which the wavelength of the laser light is 1.06 microns. This wavelength is in the infrared range transmitted by the filter 43.

In operation, when the rod 31 has been excited by pumping it with the flashlamp 33, the laser glass will emit light and amplify light of the laser wavelength. Laser light travelling axially through the rod 31 will be reflected by the reflector 37 back through the rod 31 for further amplification and will be transmitted through the filter 43, the polarizer 39 and the Pockels cell 41 to the reflector 35, whereupon the laser light will be reflected back along the same path. The Pockels cell in combination with the polarizer controls the transmissivity of the laser cavity to laser light reflected back and forth between the reflectors in accordance with the voltage applied across the Pockels cell in a manner disclosed in an article entitled Pockels Cell Primer, by Robert Goldstein, in the February 1968 issue of Laser Focus, pages 21–27. When no voltage is applied across the Pockels cell, the laser cavity is relatively transmissive to laser light reflected back and forth between the reflectors and when a predetermined voltage is applied across the Pockels cell, the laser cavity is made relatively non-transmissive to this laser light. When the laser cavity is made transmissive by means of the Pockels cell, the laser light will repeatedly be reflected back and forth between the reflectors 35 and 37 through the laser rod 31. With each transmission through the rod 31 the laser energy will be further amplified increasing the intensity of laser energy reflected back and forth between the mirrors to a high level. The laser energy reflected back and forth between the reflectors 35 and 37 built up in intensity as described above is referred to as laser oscillations. The reflector 37 is made to be partially transmissive so that a portion of the laser energy is transmitting through the reflector 37 and then through another infrared filter 45 and finally through an afocal telescope 46 comprising lenses 47, 48 and 49 to the target. In order to increase the intensity of the transmitted laser energy, the laser cavity is initially made relatively non-transmissive by means of the Pockels cell 41 while the rod 31 is being pumped by the flashlamp 33. Because the cavity is made relatively non-transmissive, the laser energy reflected back and forth between reflectors 35 and 37 cannot build up in intensity and laser oscillation cannot occur. After the rod 31 has been excited to a high degree, the laser cavity is made transmissive thus permitting high intensity laser oscillation to occur in the cavity. The high intensity laser oscillation in the cavity quickly reduces the excitation of the laser rod to a point at which the amplification in the laser rod can no longer sustain the laser oscillation and the laser oscillation ceases. As a result, a very short laser pulse on the order of 50 nanoseconds in duration is generated and transmitted by the laser transmitter.

In order to prevent a second laser pulse from being generated as a result of the re-excitation of the laser rod by the pump light which will be still irradiating the rod after the first laser pulse has been generated, the relative transmissivity of the laser cavity is reduced back to a relatively low level after a short interval on the order of half a microsecond in duration.

The laser energy reflected back and forth between the reflectors 35 and 37 is wave energy stored in the laser cavity. The ratio of this wave energy which can be stored in the cavity to the wave energy which is dissipated or lost from the cavity per unit cycle is referred to as the Q of the cavity. Thus the changing of the cavity between being relatively non-transmissive and being transmissive by means of the Pockels cell switches the Q between low and high levels respectively and is called Q switching.

The polarizer 39 in addition to polarizing the laser light in the cavity also reflects a small portion of the laser light to a start pulse detector 50. Thus, when the Pockels cell 41 Q switches the laser cavity to permit laser oscillations, a laser light pulse will be transmitted to the start pulse detector 50 to indicate the time of the generation and transmission of the laser light pulse.

The filter 45 only transmits infrared light and prevents any pump light from the flashlamp 33 from being transmitted through the telescope. This filter could also be located inside the laser cavity between the rod 31 and the reflector 37 or it could form one of the lenses of the telescope 46. The filter 43 serves to prevent the visible pump light from getting to the Pockels cell 41. This protection of the Pockels cell from the visible pump light is necessary only with some Pockels cell crystals. When the Pockels cell crystal does not need such protection the filter 43 can be eliminated. The filter 45 can also be eliminated in applications where it is not important to keep the pump light from being transmitted by the telescope.

Figure 2:
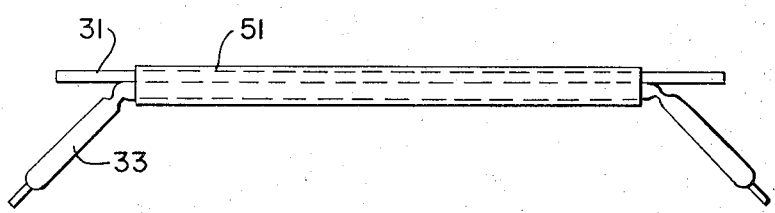
FIG. 2 illustrates the assembly of the laser rod and flash-tube together with the pump light reflector of the laser transmitter of the present invention before the assembly is encapsulated.
Figure 3:
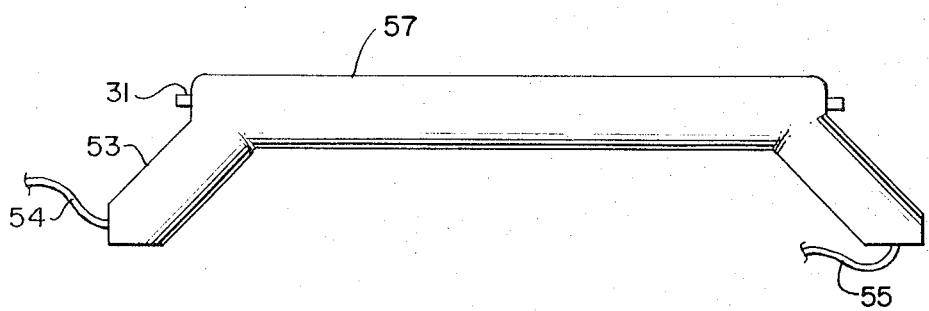
FIG. 3 illustrates the assembly of FIG. 2 after it has been encapsulated.

FIG. 2 illustrates how the laser rod 31 and the flashlamp 33 are assembled together with a pump light reflector 51. The reflector 51 is made of silver foil and is wrapped around the rod 31 and the portion of the flashlamp 33 extending parallel to the rod 31. The reflector 51 serves to concentrate the pump light generated by the flashlamp 33 in the laser rod 31. The overlapping edges and ends of the silver foil forming the reflector 51 are sealed with a thixotropic sealing compound. After the reflector 51 has been sealed, the resulting assembly is encapsulated in a resilient potting compound 53 as is best illustrated in FIG. 3 leaving the ends of the rod 31 extending free of the potting compound. The flexible cables 54 and 55 provide electrical connection to the ends of the flashlamp 33. If desired an aluminum sheath may be provided around the encapsulated parallel extending portions of the rod 31 and the flashlamp 33 to improve the mechanical strength and rigidity of the resulting assembly.

As best shown in FIGS. 4, 5 and 6, the encapsulated assembly shown in FIG. 3 is positioned in a lightweight aluminum supporting frame designated generally by the reference number 61 in a pocket defined by partitions 63–70 formed in the frame 61 and by the top wall 72 of the frame and the bottom wall 74 of the frame. This pocket is shaped to fit the encapsulated assembly shown in FIG. 3. A back partition 76 shown best in FIGS. 6 and 7 defines the back of the pocket. One leg portion 77 of the encapsulated assembly is received in the portion of the pocket defined by the bottom wall 74 and the partitions 63 and 68. An opening is defined through the partition 68 to permit the cable 54 connected to this end of the flashlamp to pass therethrough. The other leg portion 79 of the encapsulated assembly is received in the end portion of the pocket defined by the partitions 66 and 67 and by the bottom wall 74. An opening is provided through the partition 66 through which passes the other conductor 55 connected to the other end of the flashlamp. The middle portion 80 of the encapsulated assembly is received in the middle portion of the pocket defined between the top wall 72 and the partitions 64 and 65. The partitions 69 and 70 are positioned opposite the ends of the middle portion 80 out of which extend the ends of the rod 31. U-shaped slots are provided through the partitions 69 and 70 to receive the ends of the rod 31. The top wall 72, the partition 69 together with a horizontal partition 83 and a vertical extending partition 85 and the back partition 76 define a pocket 86 into which the pile of plates polarizer 39 and the infrared filter 43 are mounted. The filter 43 is mounted in a holder 87 and the pocket 86 is shaped to fit with the holder 87. The holder 87 is mounted on the partition 76 which forms the back of the pocket 86. The pile of plates polarizer 39 is bonded with resilient cement to a plate 88 which is screwed to the partition 83. The pile of plates polarizer is not actually oriented as shown in the schematic illustration of FIG. 1 but is oriented so as to reflect a portion of the laser light generated in the cavity toward the back of the pocket rather than toward the top wall 72. The orientation of the polarizer 39 is best illustrated in FIG. 8 which is a fragmentary horizontal sectional view taken through the pocket 86 on the optic axis of the laser cavity along lines 8—8 of FIG. 4. An aperture is formed in the partition 76 at the pocket 86 to permit passage of the laser light start pulse reflected by the polarizer at the time the laser pulse is generated and transmitted to the target as described above with reference to FIG. 1. The start pulse detector 50 is mounted on the frame on the other side of the partition 76 to receive the laser light start pulse.

The Pockels cell 41 is located in a pocket 89 defined by the partitions 83 and 85 together with the top wall 72 and the back end wall 90 of the aluminum frame. An aperture 92 is provided between the pockets 86 and 89 aligned with the optic axis of the laser cavity. The Pockels cell is mounted in a holder which is held in place by resilient cement orienting the Pockels cell at the correct angular position about the optic axis and parallel with the reflectors 35 and 37.

As shown in FIGS. 4 and 5, the corner of the back wall 90 is cut away to receive a plate 94. Congruent overlying recesses are cut into the abutting surfaces of the plate 94 and the back wall 90 to define a receptacle into which is fitted a holder 95 mounting the reflector 35. As best shown in the enlarged fragmentary sectional view of FIG. 9, an O-ring 96 is provided between the holder 95 and the back wall 90. The plate 94 is mounted on the back wall 90 by means of three screws angularly distributed about the optic axis of the cavity. By means of these screws the holder of the reflector 35 is made to compress the O-ring and by proper adjustment of the screws the amount of compression around the O-ring is controlled in order to adjust the angular position of the reflector to be parallel with the reflector 37. After the mirror has been properly adjusted in this manner it is cemented in position with resilient cement.

Opposite the front end of the rod 31, a pocket 101 is formed in the frame 61 between the partition 70, a horizontal extending partition 103, the top wall 72 and a vertically extending partition 105. The rod 31 extends through the partition 69 into the pocket 101, which is located on the optic axis of the laser cavity. In the pocket 101, a holder 104 mounting the reflector 37 is secured in position on the optic axis by resilient cement. The filter 45 is mounted in a holder 106, which is mounted on the partition 76 forming the back of the pocket 101. The telescope 46 is also fitted into a pocket defined in the frame 61 between the vertical partition 105, a horizontally extending partition 107, the front end wall 109 of the frame and the top wall 72. The back wall of the pocket in which the telescope 46 is mounted comprises the vertical partition 76 which extends throughout most of the frame as shown in FIG. 7. This partition has apertures 111 and 113 defined therein opposite the pocket 101 and the pocket in which the telescope is mounted to facilitate mounting the telescope 46, the reflector 37 and the filter 45. The corner of the front end wall 109 opposite the telescope 46 is cut away to receive a plate 115 which is mounted on the frame to enclose the telescope 46. The middle of the plate 115 is apertured to permit passage of the laser light pulse from the telescope to the target. The remaining partitions 120 of the frame are provided merely for purposes of strengthening the frame.

As shown in FIG. 7, the large vertical partition 76 which extends throughout most of the frame forms with the top wall 72, the back end wall 90, the front end wall 109 and the bottom wall 74 a large rectangular recess opening to the view shown in FIG. 7. In this recess a printed circuit card 121 is mounted by means of screws 123 which are threaded into lugs formed on the partition 76. On the circuit card are mounted some of the circuit components illustrated in the block diagram of FIG. 10, which is described in detail below. The cables 55 and 54 connect the flashlamp 33 to the circuit mounted on the circuit card 121. After the circuit card has been mounted in the large rectangular recess shown in FIG. 5 and after the encapsulated assembly of the laser rod and flashtube and the elements of the laser transmitter are mounted in the frame, the circuit card and encapsulated assembly are secured in the frame by potting. A resilient potting compound 124 fills in the large rectangular recess in which the circuit card 121 is mounted and fills the voids around the encapsulated assembly of the laser rod, flashtube, and pump light reflector. The potting compound is not allowed to enter the pockets in which the remaining components of the optical system are mounted. The pockets 128 in the middle of the frame defined by the partitions 120, the bottom wall 74 and the partitions 64 and 65 are only partially filled with potting compound as can best be seen in the sectional view shown in FIG. 6. After the circuit card and encapsulated assembly of the laser rod and flashtube have been potted into the frame, plates 131 as shown in FIG. 6 are fastened to the sides of the frame to complete the enclosure of the transmitter components within the frame.

The block diagram shown in FIG. 10 illustrates the circuit controlling the operation of the laser transmitter. In FIG. 10 the power supply, which comprises an inexpensive low voltage DC source such as would be provided by flashlight batteries, is designated by the reference number 151. The positive and negative terminals of the DC source 151 are connected over a double throw switch 153 to a voltage regulator 155 and to DC-to-AC converters 157 and 159. The regulator 155 applies a constant voltage regardless of the condition of the battery 151 to voltage comparator circuits 161 and 163. The converters 157 and 159 convert the applied DC voltage to an AC voltage and step the AC voltage up to a high value which is applied to AC-to-DC converters 165 and 167 respectively. The converter 165 converts the high AC voltage to a high DC voltage which it produces across an output capacitor 169. The converter 167 also converts the high AC voltage to a high DC voltage, which it produces across an output capacitor 171. The voltage produced across the storage capacitors 169 and 171 will build up gradually to the desired values and would build up beyond the desired values if the converters 157 and 159 continued to operate after the voltages across the capacitors had reached the desired values. The voltage across the capacitor 169 is applied to the voltage comparator 161 and the voltage across the capacitor 171 is applied to the voltage comparator 163. The voltage comparator 161 senses when the voltage across the capacitor 169 reaches the desired value and at this time disables the DC-to-AC converter 157 thus preventing a further build up of the voltage across the capacitor 169. Similarly, the voltage comparator 163 senses when the voltage across the capacitor 171 reaches the desired value and at this time will disable the DC-to-AC converter 159. In this manner, high DC voltages of the desired values are produced across the storage capacitors 169 and 171 from an inexpensive low voltage source 151. Voltage across the storage capacitor 169 is applied to the electrodes of the flashlamp 33 and also provides power for the trigger circuit 173. One side of the capacitor 169 and one terminal of the flashlamp 33 is grounded. The negative side of the high voltage produced across the storage capacitor 171 is connected to one side of the Pockels cell 41 through a resistor 175, the other side of Pockels cell 41 being grounded. The positive side of the capacitor 171 is connected to a squarewave generator 177. The capacitor 171 is balanced with respect to ground so that a negative potential is applied through resistor 175 to the Pockels cell 41 and a positive potential is applied to the squarewave generator 177. The squarewave generator 177 upon being triggered by the trigger circuit 173 will apply a squarewave voltage to the Pockels cell to change the voltage applied therefrom from a minus voltage to ground for the duration of the squarewave and then change the voltage across the Pockels cell back to the minus voltage. In this manner by means of the Pockels cell the laser cavity is made transmissive to laser energy reflected back and forth in the cavity for the duration of the squarewave produced with the squarewave generator 177, which is on the order of 0.5 microseconds.

After the desired voltages have been built up across the storage capacitors 169 and 171, the operator of the rangefinder will actuate a control 180, which will then apply a range command signal to the trigger circuit 173. In response to receiving this signal the trigger circuit first will apply a voltage to an autotransformer 178 which in response to the applied voltage will apply a high voltage to the pump light reflector 51 wrapped around the flashlamp 33 and laser rod 31. The resulting electric field produced by the reflector 51 in the flashlamp causes the flashlamp 33 to ionize and thus the flashlamp 33 will become energized and irradiate the laser rod 31. After a delay permitting the excitation of the laser rod 31 to build up, the trigger circuit 133 will apply a signal to the squarewave generator 177 to cause it to apply a squarewave to the Pockels cell 41 and thus switch the Q of the laser cavity to a high level. At this time laser oscillations will occur in the laser cavity as described above and the laser will generate a pulse on the order of 50 nanoseconds in duration. The trigger circuit 173, the resistor 175, the squarewave generator 177, and the autotransformer 178 comprise the portion of the circuit which is mounted on the printed circuit card 121 in the frame 61.

FIG. 11 is a circuit diagram of the squarewave generator 177 of the block diagram in FIG. 10. In FIG. 11 the negative side of the capacitor 171 is applied to a terminal 201 which is connected to one side of the Pockels cell 41 through the resistor 175. The positive side of the capacitor 171 is connected to a terminal 203, which in turn is connected through a resistor 205 and a capacitor 207 to ground. The junction between the capacitor 207 and the resistor 205 is connected through a resistor 209 to the plate of a thyratron 211. The cathode of the thyratron 211 is connected to the plate of a thyratron 213, the cathode of which is connected to ground. The junction between the thyratrons 211 and 213 is connected to the ungrounded side of the Pockels cell 41 through a capacitor 215.

The signal from the trigger circuit 173 is applied to a one shot multivibrator 217 which upon receiving the signal from the trigger circuit is switched to its astable state. Upon being switched to its astable state, the one shot multivibrator 217 will apply a pulse through a capacitor 219 and a diode 221 to the gate of a silicon controlled rectifier 223. The one shot will remain in its astable state for a predetermined interval selected to be in the order of 0.5 microseconds, whereupon it will switch back to its stable state. Upon switching back to its stable state the one shot 217 will apply a pulse through a capacitor 225 and a diode 227 to the gate of a silicon controlled rectifier 229.

The junction between the capacitor 219 and the diode 221 is connected to ground through a resistor 231 and the junction between the capacitor 225 and the diode 227 is connected to ground through a resistor 233. The gates of the silicon controlled rectifiers 223 and 229 are connected to ground through resistors 235 and 237 respectively. The anodes of the silicon controlled rectifiers 223 and 229 are connected through resistors 239 and 241 respectively to a low voltage positive source applied at terminals 243 and 245. The cathodes of the silicon controlled rectifiers 223 and 229 are connected to ground. The primary winding 251 of a transformer 253 is connected in series with a capacitor 255 across the silicon controlled rectifier 223. The secondary winding 257 of the transformer 253 is connected between the grid and cathode of the thyratron 211. The primary winding 261 of a transformer 263 is connected in series with a capacitor 265 across the silicon controlled rectifier 229. The secondary winding 267 of the transformer 263 is connected between the grid and cathode of the thyratron 213.

When the one shot multivibrator 217 switches to its astable state upon receiving the signal from the trigger circuit 173, the resulting pulse applied to the gate of the silicon controlled rectifier 223 will render the silicon controlled rectifier 223 conductive. This will discharge the capacitor 255 and cause a pulse to be applied to the primary winding 251 of the transformer 253. As a result a pulse will be applied between the grid and acthode of the thyratron 211 rendering the thyratron 211 conductive. At this time the thyratron 213 will be non-conductive. As a result the voltage at the cathode of the thyratron 211 will rise nearly to equal the voltage at the positive side of the capacitor 171. This rise in potential will be transmitted through the capacitor 215 to the Pockels cell 41. Accordingly, the voltage across the Pockels cell 41 will change from a minus value to near ground. As a result the laser cavity will become transmissive to laser light reflected back and forth in the laser cavity and laser oscillation will occur. Then the one shot multivibrator 217 will switch back to its stable state. The resulting pulse, which is applied to the gate of the silicon controlled rectifier 229, will render the silicon controlled rectifier 229 conductive. As a result, a pulse will be applied to the primary winding 261 of the transformer 263 and, accordingly, a pulse will be applied to the grid of the thyratron 213 rendering it conductive. As a result, the voltage at the plate of the thyratron 213 will drop to near ground potential and this drop in voltage will be transmitted to the Pockels cell thus driving the ungrounded side of the Pockels cell back to a high negative value. Thus the voltage across the Pockels cell will be dropped to near ground potential in response to the signal applied to the one shot 217 from the trigger circuit 173 and the Q of the laser cavity be switched to a high level for the interval determined by the one shot multivibrator. This interval, which as pointed out above is on the order of 0.5 microseconds, is selected to be sufficiently short so that only one laser pulse is generated by the transmitter.

The block diagram of FIG. 12 illustrates the laser transmitter of the present invention in a laser rangefinder. In FIG. 12, the laser transmitter of the present invention is designated by the reference number 311. The transmitter 311 upon receiving the range command signal will transmit a laser pulse to the target. The range command signal is applied to the laser transmitter 311 by the control 180 in response to being actuated by the operator as described above. The range command signal is also applied to a counter 315 to reset the count in the counter to zero. When the laser transmitter 311 generates the laser pulse a portion of the laser energy is applied to the start pulse detector 50 as described above. The start pulse detector 50 thus detects when the laser transmitter 311 transmits the laser pulse. The start pulse detector 50 in response to detecting the generation of the laser pulse in the transmitter 311 sets a flipflop 319. While the flipflop 319 is set, it will enable a gate 321, which when enabled will pass pulses generated by a clock pulse generator 323 to the counter 315 to be counted thereby. Thus, the counter 315 will begin counting pulses from the clock pulse generator 323 at the time the laser transmitter 311 transmits the pulse of laser energy. The target will reflect the laser pulse back to the rangefinder where it will be detected by a laser pulse receiver 325. The laser pulse receiver 325 in response to receiving the reflected pulse of laser energy will reset the flipflop 319 thus disabling the gate 321 so that no more pulses from the clock pulse generator are applied to the counter 315 to be counted. Thus, the counter 315 will count pulses from the clock pulse generator during the time interval it takes for the laser pulse to be transmitted to the target and then be reflected back to the receiver 325. Accordingly, the count in the counter 315 will be a precise representation of the distance of the target. Signals representing the count in the counter 315 are applied to an indicator 327, which provides a visual indication of the count registered in the counter 315. Thus, the indicator 327 will indicate the distance of the target from the transmitter.

The above described laser transmitter is lightweight, compact and operates off of a small inexpensive power supply. Moreover, because of the manner in which the optical components of the transmitter are mounted in the frame the transmitter is extremely rugged and for example is able to withstand the shock of recoil when the transmitter is mounted on a rifle.

The above description is of a preferred embodiment of the present invention and many modifications may be made thereto without departing from the spirit and scope of the invention, which is defined in the appended claims.

What is claimed is:

1. A laser transmitter comprising a glass laser rod, a flashlamp positioned adjacent to said rod adapted to excite said rod to a state in which it will amplify light, a first resilient potting material encapsulating the assembly of said rod and said flashlamp, a frame, a second resilient potting material securing the encapsulated assembly of said rod and said flashlamp in said frame, and means defining a laser cavity passing through said rod mounted in said frame.

* * * * *